United States Patent [19]

Billig et al.

[11] Patent Number: 5,214,914

[45] Date of Patent: Jun. 1, 1993

[54] TRANSLATING COWL INLET WITH RETRACTABLE PROPELLANT INJECTION STRUTS

[75] Inventors: Frederick S. Billig, Rockville; David M. VanWie, Brookeville, both of Md.

[73] Assignee: The Johns Hopkins University, Baltimore, Md.

[21] Appl. No.: 827,852

[22] Filed: Jan. 30, 1992

Related U.S. Application Data

[63] Continuation of Ser. No. 516,951, Apr. 30, 1990, abandoned.

[51] Int. Cl.⁵ .............................................. F02K 07/08
[52] U.S. Cl. ...................................... 60/204; 60/270.1; 137/15.1
[58] Field of Search ............... 60/204, 269, 270.1; 415/119; 137/15.1, 15.2; 138/40, 46

[56] References Cited

U.S. PATENT DOCUMENTS

| | | | |
|---|---|---|---|
| 2,772,620 | 12/1956 | Ferri | 137/15.1 |
| 3,250,071 | 5/1966 | Clark | 137/15.1 |
| 3,407,603 | 10/1968 | Kelley et al. | 60/270.1 |
| 3,417,767 | 12/1968 | Young | 137/15.2 |
| 3,535,882 | 10/1970 | Tizio et al. | 60/270.1 |
| 3,710,889 | 1/1973 | Lamy | 137/15.1 |
| 3,777,487 | 12/1973 | Norman et al. | 60/270.1 |
| 3,974,648 | 8/1976 | Kepler | 60/270.1 |
| 4,058,141 | 11/1977 | Hasinger et al. | 137/15.1 |
| 4,477,039 | 10/1984 | Boulton et al. | 60/270.1 |
| 4,645,140 | 2/1987 | Bevilaqua et al. | 60/269 |
| 4,951,463 | 8/1990 | Lee | 60/270.1 |

Primary Examiner—Richard A. Bertsch
Assistant Examiner—Michael I. Kocharov
Attorney, Agent, or Firm—Robert E. Archibald; Mary Louise Beall

[57] ABSTRACT

The invention is an inlet system for a variable geometry transatmospheric air breathing engine. It incorporates a rotatably translatable cowl provided with a rotating lip used in combination with insertable and propellant injection struts.

24 Claims, 5 Drawing Sheets

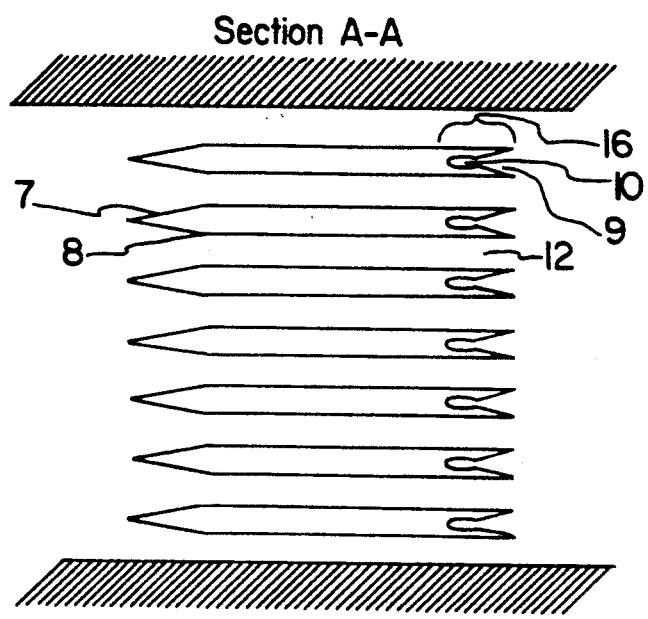
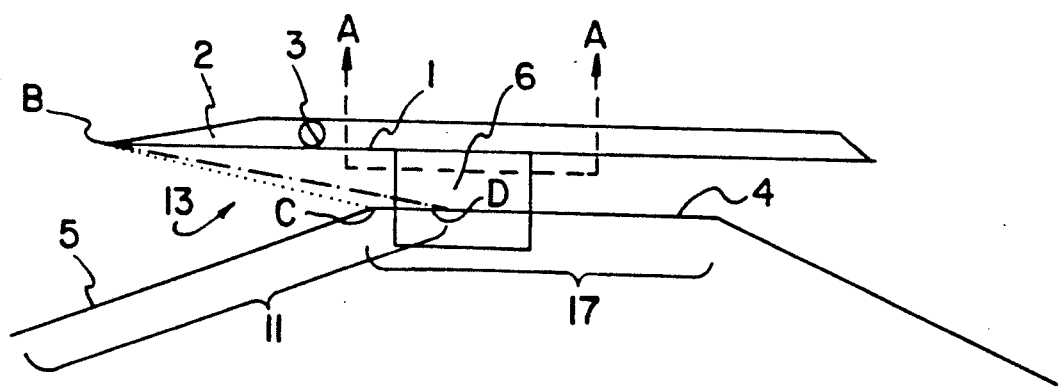
FIG. 2
FIG. 1

TRANSLATING COWL INLET WITH RETRACTABLE PROPELLANT INJECTION STRUTS

STATEMENT OF GOVERNMENTAL INTEREST

The Government has rights in this invention pursuant to Contract No. N00039-89-C-5301 awarded by the Department of the Navy.

This is a continuation of copending application(s) Ser. No. 07/516,951 filed on Apr. 30, 1990 now abandoned.

BACKGROUND OF THE INVENTION

The present invention relates to an apparatus and method for providing air compression for an airbreathing engine in a transatmospheric flight vehicle. Such a vehicle is defined as one able to operate over very large speed regimes such as in the Mach 2.5-25 range.

U.S. Pat. No. 3,974,648 relates to a variable geometry ramjet engine capable of operating in the Mach 3 to 12 range. It discloses a cowl translatable fore and aft of the center body. Because of the shape of the cowl, this longitudinal translation changes the size of the air inlet entrance.

U.S. Pat. No. 4,418,708 discloses a rotatable air scoop lip pivotally attached to the bottom of the air inlet of an aircraft operating in the Mach 1 to 4 range. The downward displacement of the lip decreases as the Mach number increases.

U.S. Pat. No. 3,535,882 discloses a translating cowl used in combination with a rotating cowl lip located at the aft end of the air inlet. This aircraft operates at speeds up to Mach 12.

U.S. Pat. No. 3,532,129 relates to a longitudinally translating cowl for a gas turbine jet propulsion engine.

U.S. Pat. Nos. 3,199,810; 3,359,736 and 4,221,230 all relate to variable geometry inlets for flight vehicles.

U.S. Pat. No. 4,291,533, having one inventor in common with the instant application, discusses the interrelationship of the inlet control system and the fuel control system. In this patent, the cowl does not translate but missile innerbody sections do in order to change the inlet geometry. Multiple injectors are located in the wall of the combustion chamber but do not move in and out of the chamber.

U.S. Pat. No. 4,058,141 discloses a plurality of horizontal blades in a diffuser. The blades are not fuel injectors but serve to divide the diffuser channel and redistribute the air flow.

OBJECTS OF THE INVENTION

It is an object of the invention to produce an engine for a flight vehicle able to operate over a wide range of speed regimes, for example in the Mach 0 to 25 range.

It is also an object of the invention to produce a variable geometry engine wherein the geometry is varied according to the speed of the flight vehicle.

Another object of the invention is to produce a variable geometry engine able to operate efficiently at several design points.

It is also an object of the invention to isolate a precombustion shock system within the engine.

Another object of the invention is to provide the appropriate air compression for a transatmospheric airbreathing engine.

Still another object of the invention is to evenly distribute fuel within the engine.

It is also an object of the invention to vary the geometry of the engine during flight to insure that the incoming air shock wave meets the shock on shoulder requirement.

SUMMARY OF THE INVENTION

The invention is an air inlet system for a variable geometry transatmospheric airbreathing engine. It incorporates a translatable cowl provided with a rotating lip used in combination with insertable and retractable propellant injection struts. The flexibility offered by the cowl movement and strut insertion allows control of the air flow, air compression, shock positioning and fuel injection and distribution.

As a transatmospheric flight vehicle leaves the surface of the earth and accelerates to speeds in the vicinity of Mach 25, the airbreathing engine encounters a variety of environmental conditions such as differences in vehicle speed and in atmospheric temperature and pressure. For example, at a given altitude, as the speed of the vehicle increases, more air enters the inlet. Also, at a constant speed, as the altitude of the vehicle increases, less air enters the inlet. Since transatmospheric flight vehicles travel at and through a variety of altitudes and travel at a variety of speeds, the ability to control the amount of air in the inlet is very beneficial. The known fixed geometry type engine only can be designed to operate efficiently under one set of conditions called the design point. By giving the engine the ability to change its geometry, the engine is able to operate efficiently at several design points, for example Mach 2.5, 5 and 10.

BRIEF DESCRIPTION OF THE DRAWINGS

FIG. 1 represents a portion of a transatmospheric flight vehicle.

FIG. 2 is a sectional view taken along line A—A of FIG. 1.

FIG. 4 represents the engine configuration at approximately Mach 2.5. FIG. 4a represents the flight vehicle and 4b is a sectional view taken along line A—A of 4a.

FIG. 5 represents the engine configuration at approximately Mach 5. FIG. 5a represents the flight vehicle and 5b is a sectional view taken along line A—A of 5a.

FIG. 6 represents the engine configuration at approximately Mach 10. FIG. 6a represents the flight vehicle and 6b is a sectional view taken along line A—A of 6a.

Figure 3:
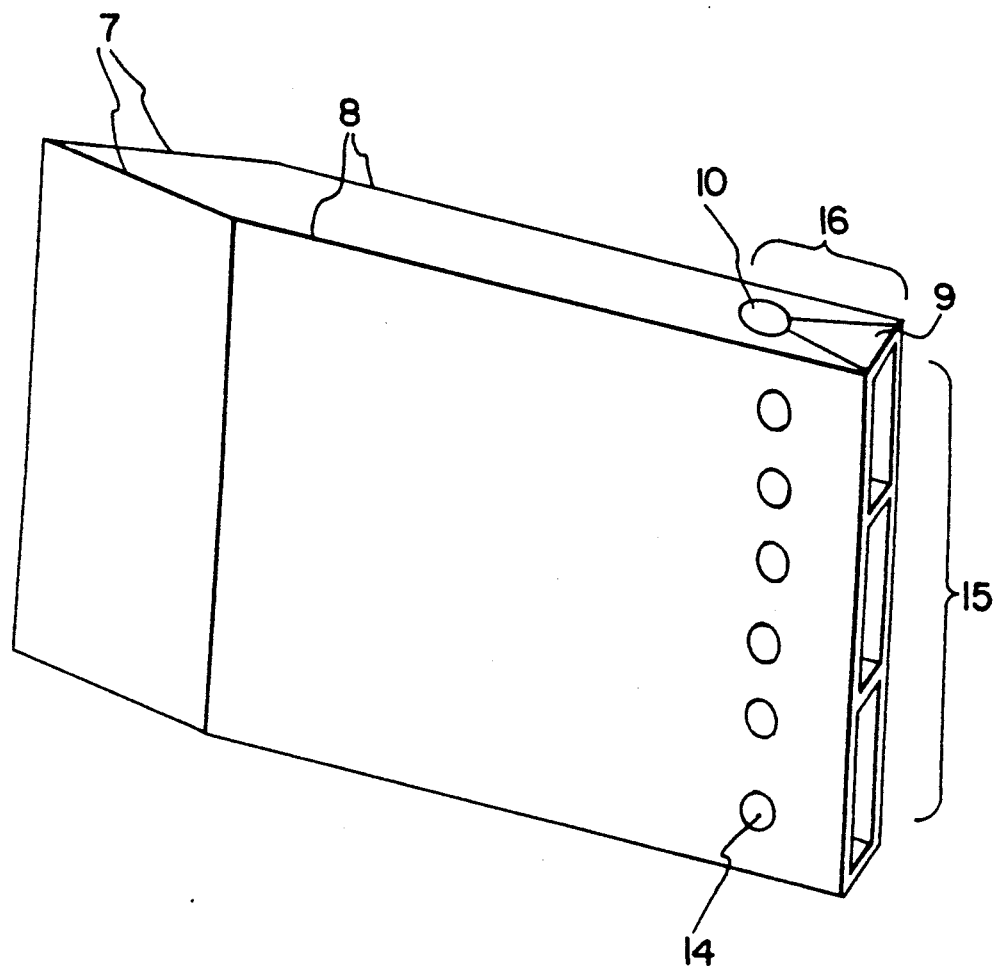
FIG. 3 demonstrates features of the insertable and retractable propellant injection strut.

A portion of the outside surface of the main body of a transatmospheric flight vehicle is shown in FIG. 1 wherein 1 is the translatable cowl provided with lip 2 rotating about pivot point 3. The outer surface of the main body of the flight vehicle 4 includes compression ramp 5. Although the cowl is shown parallel to the middle section 17 of surface 4, this alignment is not required. The air inlet is generally designated by 13 and is defined by the outer surface of the flight vehicle 4 and cowl 1. Inlet 13 is further defined by the propellant injection strut(s) 6 able to be inserted and retracted from the inlet. Compression ramp 5 and a portion of section 17 form the inlet compression area 11.

When cowl is translated away from flight vehicle surface 4, the cross-sectional area of inlet 13 is enlarged. When it is translated towards surface 4, the cross-sectional area is reduced. Lip 2 rotates away from surface 4 to enlarge the air inlet entrance and rotates towards surface 4 to reduce or close the entrance.

FIG. 2 is a section taken along line A—A of FIG. 1 providing details of the at least one propellant injection strut 6. Each strut is provided with a wedge shaped leading edges 7 acting to turn and compress air entering air inlet 13. Extending from leading edge 7 is a constant area length 8 defining the isolator area 12 for containing the precombustion shock system. An axial propellant injector 16 is formed by the convergent divergent nozzle 9 and the thrust chamber 10.

FIG. 3 shows details of a single propellant injection strut including wedge shaped leading edge 7, constant area section 8, axial propellant injectors 16 (only one shown) and normal propellant injector orifices 14. Each axial injector 16 is formed by a thrust chamber 10 and a convergent, divergent nozzle 9. In the example shown in FIG. 3, three axial injectors are provided as shown by the three divergent openings of nozzles 9. Segmented rocket motors 15 are formed by the combination of convergent divergent nozzles 9 and thrust chambers 10 when the propellants supplied to axial injectors 16 are fuel and/or oxidizer which are combusted in thrust chambers 10 and exhausted through nozzles 9. The combination of nozzles 9 and chambers 10 operates as a jet engine (ram jet, scram jet or dual mode jet engines) when propellant supplied to axial injectors 16 and/or normal propellant injector orifices 14 is combusted adjacent to or downstream of the strut. Axial injectors 16, because of their convergent divergent configuration, are supersonic injections. Normal injector orifices 14 (six shown in FIG. 3) are convergent nozzles and are considered sonic nozzles. It is understood that "normal" used in this context includes, right, acute or obtuse injection.

Referring again to Figure as the flight vehicle moves through the atmosphere, air moves up inlet compression area 11 via compression ramp 5 and enters inlet 13. When air reaches the forward tip of lip 2 point B it is turned parallel to cowl lip 2 and generates a shock wave such as B-C. When incoming air encounters shock wave, it is slowed and turned which causes the air to be compressed. If cowl 1 and lip 2 are in the proper position for the particular speed of the vehicle, the shock wave has the form of dotted line B-C. Since point C is the shoulder of the inlet, this is called "shock on shoulder". The dot-dashed line B-D is an example of a shock wave formed by the incoming air when cowl 1 and/or lip 2 are not in the proper position for the particular speed of the vehicle. For example, shock wave B-C is formed with the cowl and lip position of FIG. 1 when the flight vehicle is travelling at approximately Mach 5. Shock wave B-D is formed with the cowl and lip position of FIG. 1 when the flight vehicle is travelling at approximately Mach 10. To insure the shock on shoulder position at Mach 10, the cowl and lip positions should be those shown in FIG. 6a. A main object of the invention is to properly position cowl 1 and lip 2 to insure that the shock wave strikes shoulder C. This maximizes the efficiency of the compression in the inlet compression area.

Compression efficiency is also enhanced by the presence of strut(s) 6 in the inlet in that a second shock compression system is formed by wedge shaped leading edge(s) 7. Propellant struts 6 also serve to provide and evenly distribute propellant and oxidizer.

DESCRIPTION OF THE PREFERRED EMBODIMENTS

Figure 4B:
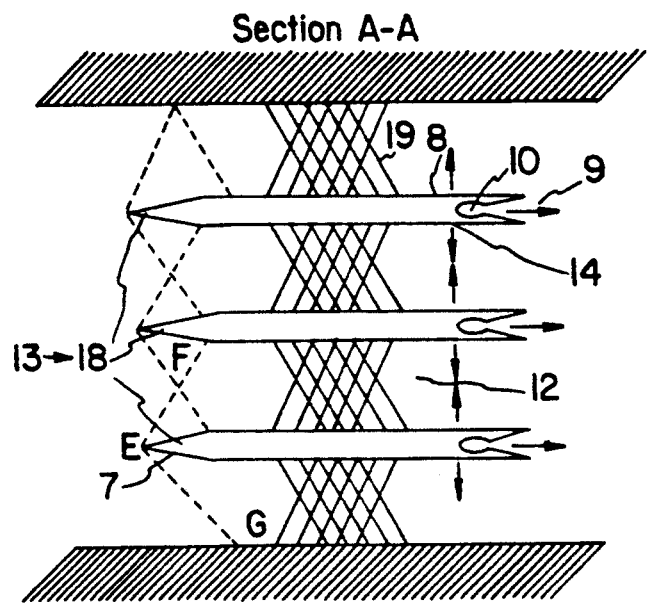
Figure 4A:
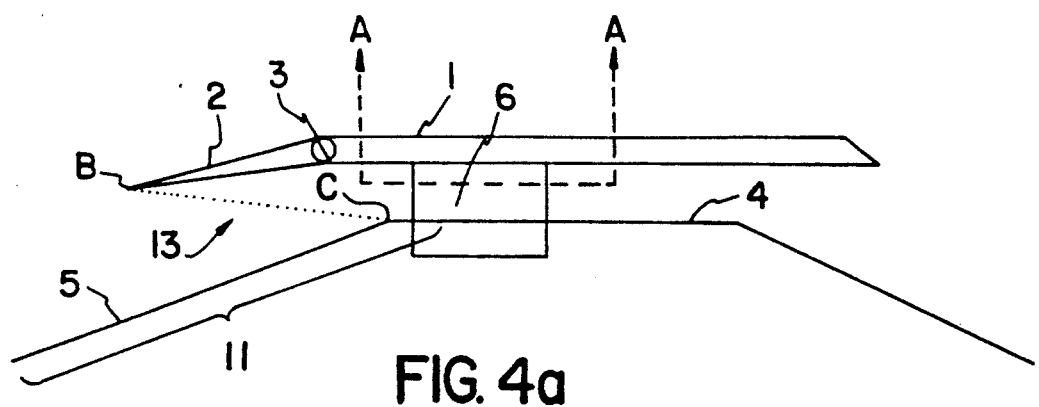

FIG. 4a demonstrates the appropriate positions for cowl 1 and lip 2 when the engine is operating at approximately Mach 2.5. In this situation, lip 2 is rotated toward air compression ramp 5 in order to reduce drag. Note shock wave B-C formed when incoming air is turned at point B. This is the shock on shoulder position which sets up the first shock compression system similar to that described above for FIG. 1.

A second shock compression occurs at the forward end of propellant injection strut 6. As shown in FIG. 4b, when incoming air, after passing through cowl shock B-C, reaches point(s) E of wedge shaped leading edges 7, it is turned parallel to leading edge(s) 7, forming shock wave(s) E-F. As the incoming air encounters this shock wave, it is slowed, turned and compressed. Since point F is the shoulder of the particular injector, this is a second shock on shoulder design position. There is no shoulder at points G so the shock wave E-G is different from shock wave E-F. However the shock on shoulder requirement may be met by changing the width of the outboard isolator areas 12.

Incoming air is compressed a third time when it encounters precombustion shock system 19 isolated in isolator area(s) 12. Shock system 19 is caused by back pressure from combustion occurring adjacent or downstream of strut(s) 6 when the engine is operating as a jet engine.

At Mach 2.5 as shown in FIGS. 4a and 4b, only primary struts 18 are shown inserted into inlet 13. At this speed, struts 18 are sufficient to provide the appropriate compression for the engine. If both primary struts 18 and secondary struts 21 (described below in FIG. 5b) are inserted here, the compression is too high.

Figure 5B:
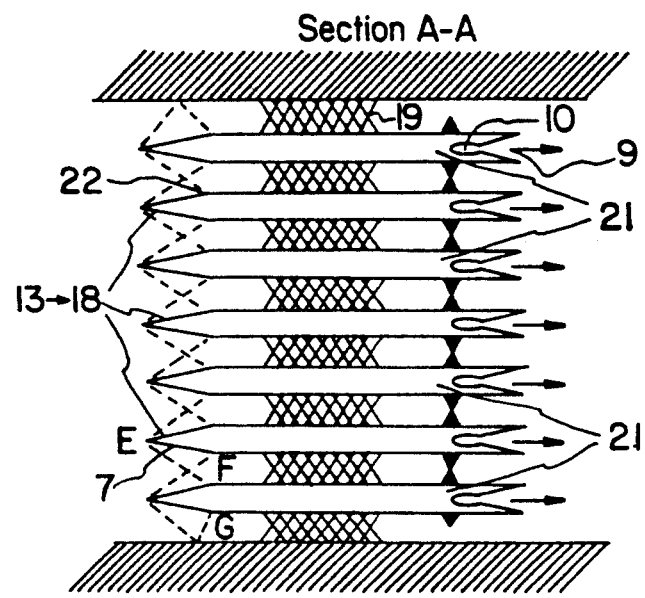
Figure 5A:
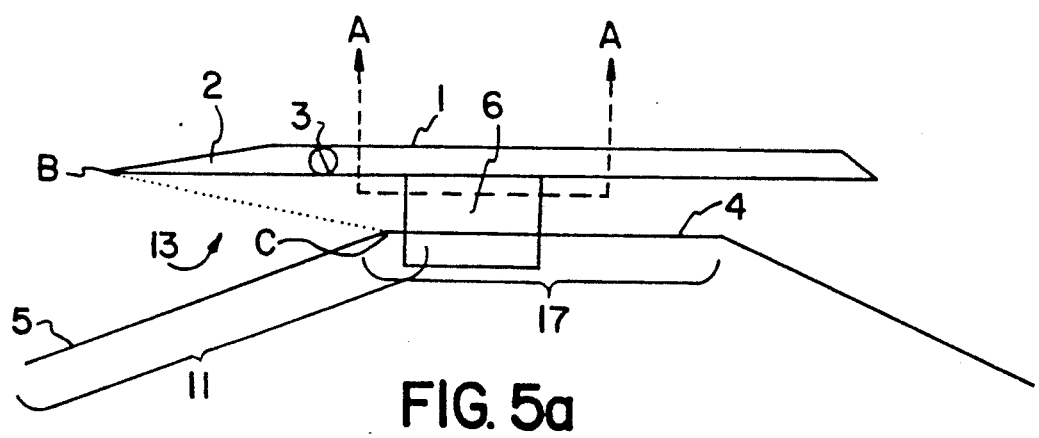

FIGS. 5a and 5b are similar to FIGS. 4a and 4b respectively. However the former Figures demonstrate the lip and cowl positions and the number of inserted struts appropriate for efficient engine operation at approximately Mach 5. At this speed, the engine is operating as a jet with combustion occurring adjacent or downstream of struts 6. This creates precombustion shock system(s) 19 in constant area length(s) 8. Cowl 1 is translated to its most open position to maximize airflow through the engine. Lip 2 is in the horizontal position co-linearly extended from the remainder of cowl 1. Because more compression of air entering inlet 13 is required at this speed than at the lower speed discussed above, both primary struts 18 and secondary struts 21 are inserted in inlet 13. This allows the appropriate compression to be obtained and supplies and distributes propellant.

Figure 6B:
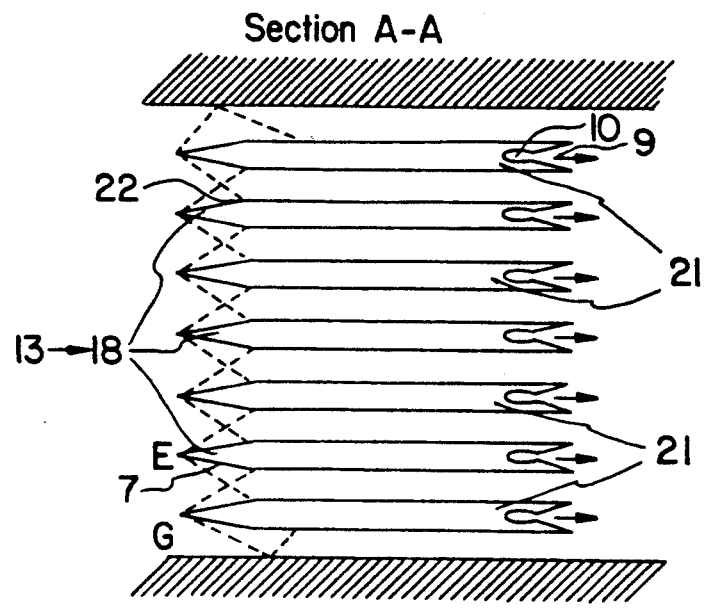
Figure 6A:
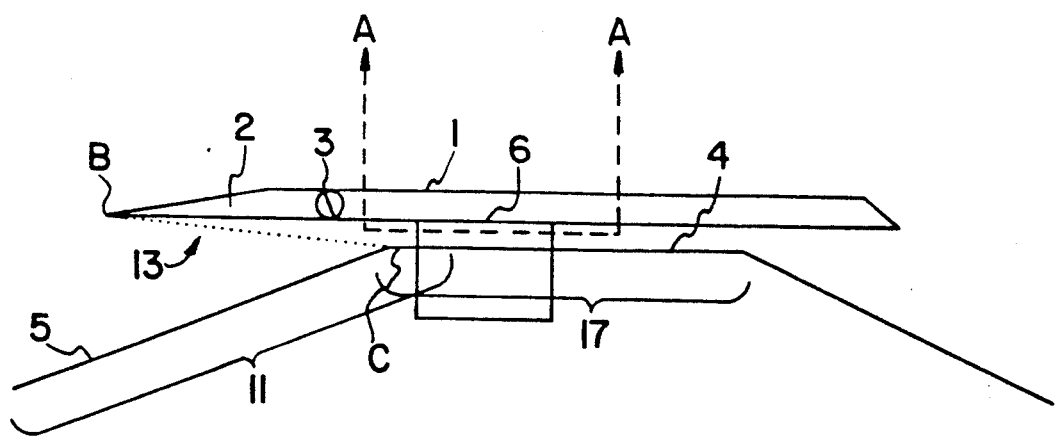

FIGS. 6a and 6b are also similar to FIGS. 4a and 4b respectively. However the former Figures demonstrate the lip and cowl positions and the number of inserted struts appropriate for efficient engine operation beginning at approximately Mach 10. In this embodiment, the inserted struts 6 are operating as rockets with propellant supplied through axial injectors 16, combustion occurring in chamber 10 and thrust acting against the forward wall of chamber 10. Propellant is a combination of fuel and oxidizer. There is little if any precombustion shock system. Cowl 1 is moved close to outer surface 4 of the flight vehicle in order to maintain control of shock positioning (shock on shoulder) within the engine and the cowl is rotated to the horizontal position. Both primary struts 18 and secondary struts 21 are inserted into the inlet.

Although three embodiments have been illustrated and described above, this invention allows the air-breathing engine used in a transatmospheric flight vehicle to have its geometry specifically tailored to meet the specific requirements. For example, the jet engine and the rocket are capable of operating at speeds in the same Mach range. For example, at Mach 10, the engine is capable of joint operation as a jet and as and as a rocket. In this situation, propellant is supplied through both axial injectors 16 and normal injection orifices 14. Oxidizer is supplied through axial injectors 16. However, for purposes of efficiency, it is often beneficial to operate as a jet at lower Mach regimes and as a rocket at higher Mach regimes.

"Propellant" as used in this description may be fuel and/or oxidizer. Fuel may be one of hydrogen, liquid methane, and a hydrogen/boron slurry, for example. Oxidizer may be oxygen or nitrogen tetrahydroxide, for example.

Thus, the air inlet of the present invention provides the flight vehicle engine with the ability to vary the engine geometry according to flight conditions. The amount of air captured may be controlled by translating cowl 1 and rotating lip 2. The shock on shoulder requirement to enhance compression efficiency may also be met by translating cowl 1 and rotating lip 2. The efficiency of the second shock system may be enhanced by changing the number of propellant injection struts 6 present in the inlet. The provision and distribution of propellant within the engine may also be controlled by having the appropriate number of struts 6 present in the inlet. As shown in the embodiments, it is the combination of cowl 1, lip 2, and number of struts which provides the flexibility required for the transatmospheric flight vehicle.

The invention described is not intended to be limited to the embodiments disclosed but includes modifications made within the true spirit and scope of the invention.

We claim:

1. A process for compressing air to be provided to a variable geometry airbreathing engine in a transatmospheric flight vehicle comprising:
   providing an air inlet defined by the outer surface of the main body of the flight vehicle, said surface comprising a compression ramp and a midsection and including an air inlet shoulder located at the junction of the compression ramp and the midsection, and a cowl provided with a rotatable lip, the entire cowl able to translate radially towards and away from the main body of the flight vehicle;
   means supplying air to the inlet;
   providing at least one propellant injection strut provided with propellant injectors and able to be inserted into and retracted from the inlet; and including:
   a) rotating the cowl lip to enlarge and reduce the air inlet entrance;
   b) translating the entire cowl including the lip to enlarge or reduce the cross-sectional area of the inlet;
   c) inserting and retracting the propellant injection strut(s); and
   d) supplying propellant to the engine through the propellant injectors; wherein steps a–d are adjusted and coordinated according to the speed of the flight vehicle to form a shock wave between the forward tip of the lip and the shoulder, to maintain the desired pressure in an isolator area and to evenly distribute fuel within the engine for a given trajectory.

2. A process according to claim 1, wherein said at least one propellant injection strut is a primary fuel injection strut and including:
   providing at least one secondary propellant injection strut provided with propellant injectors and able to be inserted into and retracted from the inlet, both of said primary and secondary propellant injection struts able to be inserted and retracted independently of each other.

3. A process according to claim 2 wherein the leading edge of each strut is wedge shaped and further wherein each of said struts is provided with a constant area length extending from said wedge shaped leading edge and defining an isolator area for containing a precombustion shock system, including:
   compressing the air by contact with the leading edge wedge shape and conducting it to the isolator area.

4. A process according to claim 3, including:
   providing at least one normal propellant injection orifice and least one axial propellant injector on each of said struts.

5. A process according to claim 4, wherein incoming air is compressed by the precombustion shock system present in the isolator area.

6. A process according to claim 5, at the speed of approximately Mach 2.5, comprising:
   rotating the cowl lip toward the surface of the vehicle to minimize drag;
   translating the cowl to its most open position to maximize airflow through the engine;
   inserting the primary struts into the inlet; and
   supplying fuel to the engine through both the normal injection orifice(s) and the axial injector(s).

7. A process according to claim 5, at the speed of approximately Mach 5, comprising:
   rotating the cowl lip into a horizontal position;
   translating the cowl to its most open position to maximize airflow through the engine;
   inserting the primary and secondary propellant injection struts into the inlet; and
   supplying propellant to the engine through both the normal injection orifice(s) and the axial injector(s).

8. A process according to claim 5, at the speed of approximately Mach 10, comprising:
   rotating the cowl lip into a horizontal position;
   translating the cowl toward the surface of the vehicle to maintain control of shock positioning within the engine;
   inserting the primary and secondary propellant injection struts into the inlet; and
   supplying the majority of the propellant to the engine through the axial injectors.

9. A process according to claim 3, wherein incoming air is compressed by the precombustion shock system present in the isolator area.

10. A process according to claim 3, at speeds in the range of Mach 10–25, comprising :
    rotating the cowl lip into a horizontal position;
    translating the cowl toward the surface of the vehicle to maintain control of shock positioning within the engine;
    inserting the primary and secondary fuel injection struts into the inlet; and supplying the propellant through the axial injectors and operating the axial injectors as rocket motors providing thrust to the flight vehicle.

11. An air inlet system for a transatmospheric flight vehicle using a variable geometry airbreathing engine comprising:

a cowl provided on its forward end with a rotating lip, the entire cowl including the lip able to translate radially towards and away from the main body of the flight vehicle;

an air inlet defined by the cowl and by the outer surface of the main body of the flight vehicle, said surface comprising a compression ramp and a midsection and including an air inlet shoulder located at the junction of the compression ramp and the midsection; and at least one propellant injection strut provided with an isolator area and able to be inserted into and retracted out of the inlet;

wherein the cowl and lip position(s) determine the cross-sectional area of the inlet and the air flow through the engine in order to form an air shock wave between the forward tip of the cowl lip and the shoulder and further wherein the cross-sectional area of the inlet and the number of propellant injection struts present in the inlet are adjusted according to the speed of the flight vehicle in order to maintain the desired pressure in an isolator area for a given trajectory.

12. An inlet system according to claim 11, wherein the cowl lip is able to rotate away from the flight vehicle surface to enlarge the air inlet entrance and able to rotate towards the flight vehicle surface to reduce or close the air inlet entrance.

13. An inlet system according to claim 11, wherein the cowl is translated away from the flight vehicle surface to enlarge the cross-sectional area of the inlet and is translated toward the flight vehicle surface to reduce the cross sectional area of the inlet.

14. An inlet system according to claim 11, wherein said at least one propellant injection strut is a primary injection strut and further comprising at least one secondary propellant injection strut, both of said primary and secondary struts able to be inserted and retracted independently of each other.

15. An inlet system according to claim 14, wherein the inlet is further defined by at least one secondary propellant injection strut, each of said strut(s) being provided with a wedge shaped leading edge acting to provide air compression for the engine.

16. An inlet system according to claim 15, wherein incoming air is compressed by the precombustion shock system present in the isolator area.

17. An inlet system according to claim 15, wherein each of said struts is provided with a constant area length extending from the wedge shaped leading edge, said constant area length defining the isolator area for containing a precombustion shock system.

18. An inlet system according to claim 14, wherein each of said strut(sd) comprises at least one normal propellant injection orifice and at least one axial propellant injector located in the aft end of the strut both able to supply propellant and further wherein each of said axial fuel injector(s) may be operated as a rocket motor.

19. An inlet according to claim 18, wherein each axial propellant injector comprises a thrust chamber and a convergent divergent nozzle.

20. An inlet system according to claim 11, wherein the inlet is further defined by said at least one propellant injection strut, each of said strut(s) being provided with a wedge shaped leading edge acting to provide air compression for the engine.

21. An inlet system according to claim 20, wherein each of said struts is provided with a constant area length extending from the wedge shaped leading edge, said constant area length acting as the isolator area for containing a precombustion shock system.

22. An inlet system according to claim 21, wherein incoming air is compressed by the precombustion shock system present in the isolator area.

23. An inlet system according to claim 11, wherein each of said strut(s) comprises at least one normal propellant injection orifice and at least one axial propellant injector located in the aft end of the strut both able to supply propellant and further wherein each of said axial fuel injector(s) may be operated as a rocket motor.

24. An inlet according to claim 23, wherein each axial propellant injector comprises a thrust chamber and a convergent divergent nozzle.

* * * * *